(12) United States Patent
Marocchini et al.

(10) Patent No.: US 10,330,019 B2
(45) Date of Patent: Jun. 25, 2019

(54) SELF-ACTUATING AND DUAL PIVOT FLAPPER VALVE

(71) Applicant: Hamilton Sundstrand Corporation, Charlotte, NC (US)

(72) Inventors: Francis P. Marocchini, Somers, CT (US); Aaron F. Rickis, Feeding Hills, MA (US); Robert Goodman, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 906 days.

(21) Appl. No.: 14/630,688

(22) Filed: Feb. 25, 2015

(65) Prior Publication Data

US 2016/0245186 A1    Aug. 25, 2016

(51) Int. Cl.
| | |
|---|---|
| *F02C 7/18* | (2006.01) |
| *F16K 15/03* | (2006.01) |
| *F02C 9/18* | (2006.01) |
| *F04D 27/02* | (2006.01) |
| *F02C 6/08* | (2006.01) |

(52) U.S. Cl.
CPC .................. *F02C 9/18* (2013.01); *F02C 6/08* (2013.01); *F04D 27/023* (2013.01); *F04D 27/0215* (2013.01); *F16K 15/036* (2013.01); *F05D 2270/101* (2013.01); *Y02T 50/671* (2013.01)

(58) Field of Classification Search
CPC ... F04D 27/0215; F04D 27/023; F16K 15/036
See application file for complete search history.

(56) References Cited

U.S. PATENT DOCUMENTS

| | | | |
|---|---|---|---|
| 2,831,499 A | 4/1958 | Myron | |
| 3,630,138 A * | 12/1971 | Marcussen | B64D 13/00 454/113 |
| 4,850,796 A | 7/1989 | Miller | |
| 5,279,109 A | 1/1994 | Liu et al. | |
| 7,555,905 B2 * | 7/2009 | Borcea | F02C 6/08 215/279 |
| 8,015,825 B2 | 9/2011 | Elder et al. | |
| 8,128,347 B2 | 3/2012 | Sokhey | |
| 8,408,009 B2 | 4/2013 | Blanchard et al. | |
| 8,516,827 B2 | 8/2013 | Kirby | |
| 8,590,308 B2 | 11/2013 | Kirby | |

(Continued)

FOREIGN PATENT DOCUMENTS

FR    2972492 A1    9/2012

OTHER PUBLICATIONS

European Search Report for European Application No. 16157431.4 dated Jul. 19, 2016.

*Primary Examiner* — Kayla McCaffrey
(74) *Attorney, Agent, or Firm* — Carlson, Gaskey & Olds, P.C.

(57) ABSTRACT

A bleed valve includes a valve body, a first flapper body movable relative to the valve body between an open position and a closed position, and a second flapper body movable relative to the valve body between an open position and a closed position. A resilient member biases the first and second flapper bodies to the open position to vent bleed air. The first and second flapper bodies move to the closed position when a pressure load across the first and second flapper bodies exceeds a biasing force of the resilient member. A gas turbine engine is also disclosed.

16 Claims, 2 Drawing Sheets

(56) References Cited

U.S. PATENT DOCUMENTS

| | | |
|---|---|---|
| 8,661,833 B2 | 3/2014 | Army |
| 8,814,498 B2 | 8/2014 | Goodman et al. |
| 2004/0118105 A1 | 6/2004 | Aitchison et al. |
| 2012/0067061 A1 | 3/2012 | Wright et al. |
| 2012/0180886 A1 | 7/2012 | Army et al. |
| 2013/0276892 A1 | 10/2013 | Kamp et al. |
| 2014/0109589 A1 | 4/2014 | Pritchard, Jr. et al. |
| 2014/0245747 A1 | 9/2014 | Pritchard, Jr. et al. |
| 2014/0366964 A1 | 12/2014 | Kamp et al. |

* cited by examiner

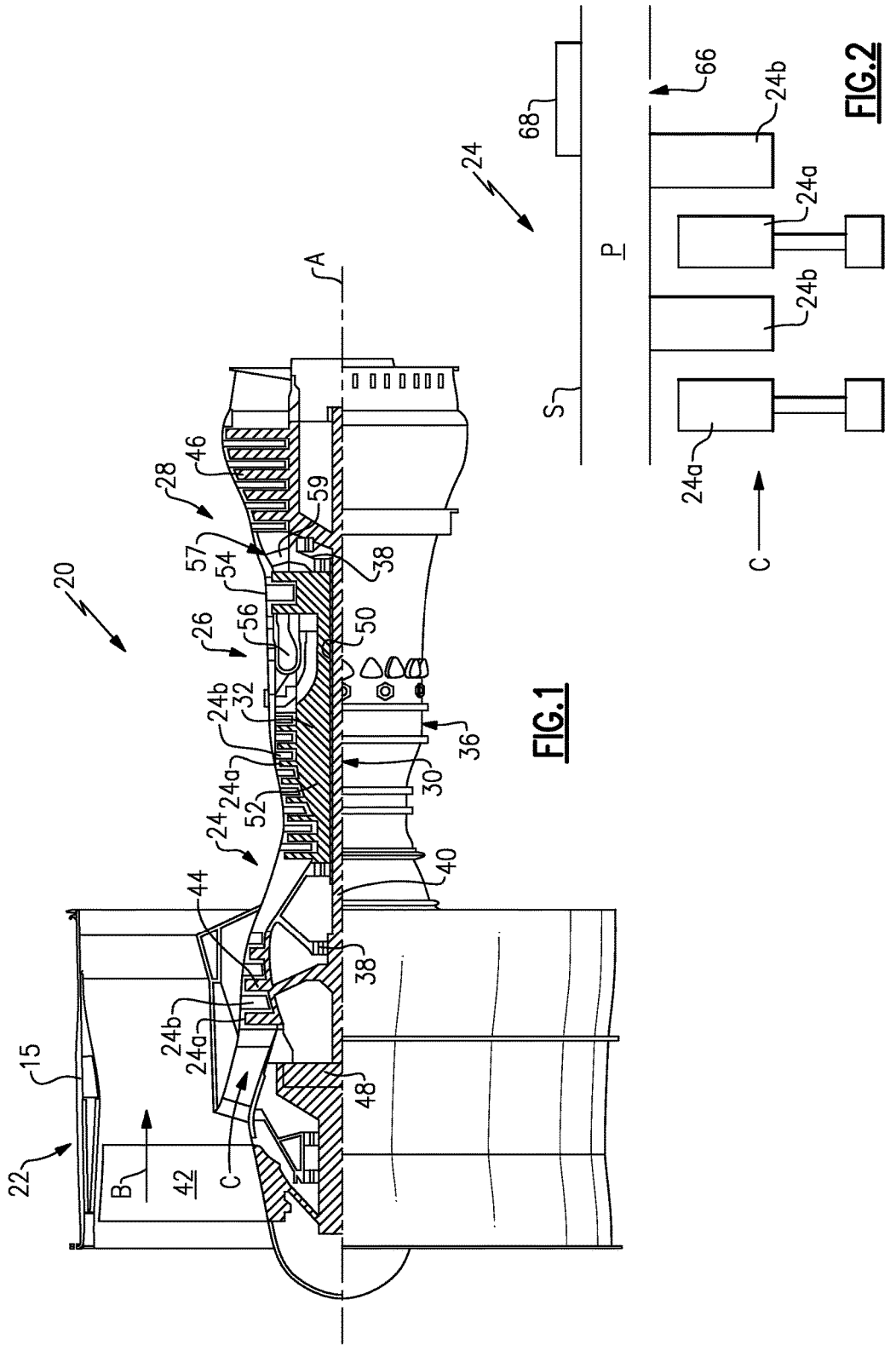

SELF-ACTUATING AND DUAL PIVOT FLAPPER VALVE

BACKGROUND OF THE INVENTION

Gas turbine engines are provided with a number of functional sections, such as a fan section, compressor section, combustion section, and a turbine section, for example. At a start-up condition for the gas turbine engine, the turbine section has not begun to fully provide power. Thus, driving the compressor can be more challenging than at a steady state condition. A bleed valve is typically utilized to bleed air away from the compressor section during start-up to reduce he load on the compressor section.

Typically, these bleed valves comprise poppet valves that require a large geometric area to meet a specified flow effective area. One example of a poppet-style bleed valve is shown in U.S. Pat. No. 8,814,498. Traditionally, these valves are bulkhead mounted, or are duct mounted with right angle ducting. These valves have not been streamlined with the engine and suffer from a packaging standpoint.

SUMMARY OF THE INVENTION

In a featured embodiment, a bleed valve includes a valve body, a first flapper body movable relative to the valve body between an open position and a closed position, and a second flapper body movable relative to the valve body between an open position and a closed position. A resilient member biases the first and second flapper bodies to the open position to vent bleed air. The first and second flapper bodies move to the closed position when a pressure load across the first and second flapper bodies exceeds a biasing force of the resilient member.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 1 is a schematic representation of one example of a gas turbine engine.

FIG. 2 is a schematic representation of a bleed system for a compressor section of the gas turbine engine shown in FIG. 1.

DETAILED DESCRIPTION

Figure 3:
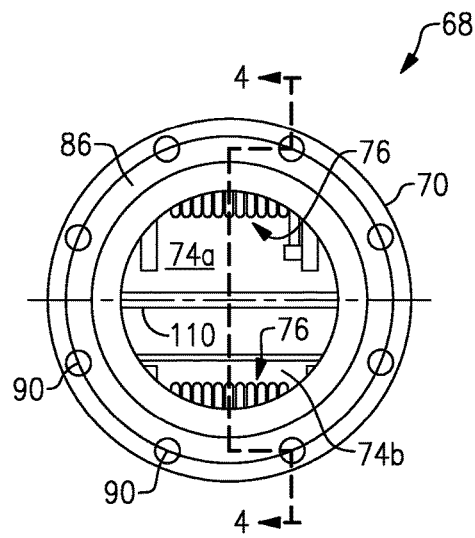
FIG. 3 is an inlet end view of a bleed valve as used in the bleed system of FIG. 2.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

As known, the compressor section 24 includes a plurality of rotating compressor blades 24a and fixed vanes 24b along a compressor gas path. The core airflow C is communicated along the compressor gas path into the downstream turbine section 28. As schematically shown in FIG. 2, an air plenum P is positioned outwardly of the compressor gas path such that compressed air flows through openings 66 from the compressor gas path and into the air plenum P to provide a bleed flow system.

A bleed valve 68 is moveable between open and closed positions and provides an outlet that selectively vents air from the air plenum P. The bleed valve 68 is in the open position at an engine start-up condition to vent high pressure bleed air into, for example, the nacelle or ambient, which in turn reduces the load on the compressor section 24. Thus, at start-up and lower pressure conditions, the bleed valve 68 reduces the load required to drive the compressor section 24. The bleed valve 68 closes once the compressor section 24 has reached operational pressures, e.g. steady-state conditions, such that the engine can operate as intended.

The bleed valve 68 includes a valve body 70 providing a valve seat or stop 72. The valve body 70 is mounted within the compressor section 24 to a static case structure S (FIG. 2), for example. The bleed valve 68 includes a first flapper body 74a movable relative to the valve seat 72 between open closed positions, and a second flapper body 74b movable relative to the valve seat 72 between open and closed positions. A resilient member 76 biases the first 74a and second 74b flapper bodies to the open position to vent the bleed air. When a pressure load across the first 74a and second 74b flapper bodies exceeds a biasing force of the resilient member 76, the first 74a and second 74b flapper bodies move to the closed position.

The first 74a and second 74b flapper bodies are biased to the open position during an engine start-up condition or a low pressure condition. The first 74a and second 74b flapper bodies are then moved to the closed position during a steady-state engine condition when the pressure load exceeds the biasing force to allow for normal operation of the engine.

In one example, the resilient member 76 comprises at least a first spring 76a associated with the first flapper body 74a and a second spring 76b associated with the second flapper body 74b. The first flapper body 74a pivots about a first pivot axis A1 and the second flapper body 74b pivots about a second pivot axis A2 independently of the first flapper body 74a. The valve body 70 defines a center axis A3 along which air flows through the valve body 70.

The first A1 and second A2 pivot axes are non-parallel with the center axis A3. Further, in one example, the first pivot axis A1 is spaced radially outwardly of one side of the center axis A3 and the second pivot axis A2 is spaced radially outwardly of an opposite side of the center axis A3. In one example, the first A1 and second A2 axes are non-intersecting and orientated orthogonal relative to the center axis A3.

A first pivot shaft 78a is mounted to the valve body 70 to define the first pivot axis A1 and a second pivot shaft 78b is mounted to the valve body 70 to define the second pivot axis A2. The first spring 76a is associated with the first pivot shaft 78a and the second spring 76b is associated with the second pivot shaft 78b. In one example, the first spring 76a is concentric with the first pivot shaft 78a and the second spring 76b is concentric with the second pivot shaft 78b. This provides for independent dual-pivoting in a very compact configuration.

In one example, the valve body 70 comprises an inlet housing 80 and an outlet housing 82 mounted to the inlet housing 80. In one example mounting configuration, the inlet 80 and outlet 82 housing are secured together via a V-band flange mounting structure; however, other attachment configurations could also be used. At least one seal 84 is located between the inlet 80 and outlet 82 housings.

Figures 4, 5:
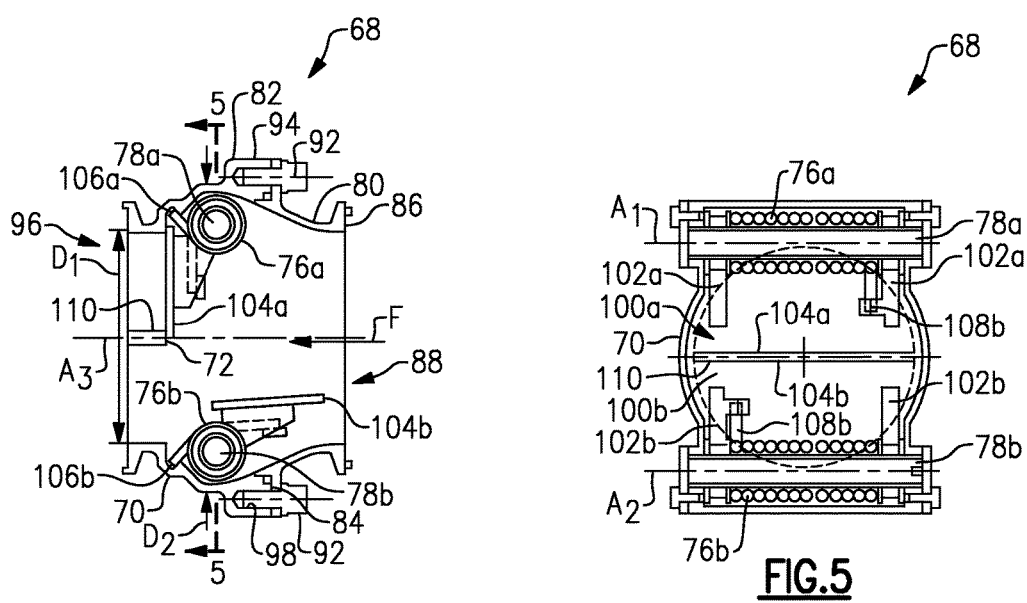
FIG. 4 is a section view taken along line 4-4 of FIG. 3.
FIG. 5 is a section view taken along line 5-5 of FIG. 4.

As shown in FIGS. 3-5, inlet housing 80 includes a first mount flange 86 that surrounds an open inlet 88. The first mount flange 86 includes a plurality of openings 90 configured to receive fasteners 92. The outlet housing 82 includes a second mount flange 94 that surrounds an open outlet 96. The second mount flange 94 includes a plurality of openings 98 that are aligned with the openings 90 in the first mount flange 86 such that the fasteners 92 can attach the inlet 80 and outlet 82 housings together. The seal 84 is sandwiched between the first 86 and second 84 mount flanges.

The first 78a and second 78b pivot shafts, and the first 76a and second 76b springs, are enclosed within the valve body 70 to provide a compact package. In one example, the valve body 70 includes a first portion defined by a first diameter D1 at the outlet 96 and a second portion defined by a second diameter D2 greater than the first diameter D1 to provide a mounting area for the first 78a and second 78b pivot shafts. The second portion comprises a radially enlarged portion that receives the first 78a and second 78b pivot shafts such that the shafts do not obstruct a flow path F through the valve body 70. The diameter of the flow path F generally corresponds to the first diameter D1.

The first flapper body 74a comprises a flat plate portion 100a with mounting arms 102a that fix the plate portion 100a to the first pivot shaft 78a. Thus, one end of the first flapper body 74a is coupled for movement with the first pivot shaft 78a. The first flapper body 74a extends to a first distal end 104a that pivots about the first pivot axis A1. The first spring 76a surrounds the first pivot shaft 78a and is seated between the arms 102a. One spring end 106a is seated within the valve body 70 (FIG. 4) and the opposite spring end 108a is fixed to the first plate portion 100a via a mounting boss associated with one of the arms 102a (FIG. 5).

The second flapper body 74b comprises a flat plate portion 100b with mounting arms 102b that fix the plate portion 100b to the second pivot shaft 78b. Thus, one end of the second flapper body 74b is coupled for movement with the second pivot shaft 78b. The second flapper body 74b extends to a second distal end 104b that pivots about the second pivot axis A2. The second spring 76b surrounds the second pivot shaft 78b and is seated between the arms 102b.

One spring end 106b is seated within the valve body 70 (FIG. 4) and the opposite spring end 108b is fixed to the second plate portion 100b via a mounting boss associated with one of the arms 102b (FIG. 5).

The valve body 70 includes a stop or seat 72 that cooperates with the first 104a and second 104b distal ends to define the closed position. Thus, the first 74a and second 74b flapper bodies comprise swinging door portions, each with their own independent pivot, that cooperate with each other to close the flow path F when the pressure load exceeds the biasing forces of the associated springs 76a, 76b. In one example, the stop or seat comprises a rib 110 formed as part of the valve body 70.

FIGS. 3-4 show a configuration where the first flapper body 74a is in the closed position and the second flapper body 74b is in the open position. FIG. 5 shows a configuration where both flapper bodies 74a, 74b are closed. It should be understood that the first and flapper bodies 74a, 74b are intended to either both be in the closed position, or both be in the open position. The views shown in FIGS. 3-4 are simply comparing the closed position vs. the open position.

As discussed above, the flapper bodies or doors 74a, 74b are both biased to the open position. When a predetermined differential pressure occurs across the flapper doors 74a, 74b, during engine start, the pressure load across the doors 74a, 74b overcomes the spring preload and starts to close the valve 68. As the valve 68 starts to close, the pressure differential increases faster than the spring force increase and the valve 68 snaps shut. To make the valve 68 snap shut within a narrow specified band, the maximum pressure differential must be created across the flapper doors 74a, 74b. The velocity effect over the flappers provides a lower than static pressure on the downstream side of the doors 74a, 74b and creates a closing force. This sensing approach maximizes the pressure differential across the flapper doors 74a, 74b as flow increases. The spring force is set for the condition where the valve 68 should initiate closure. The flow path geometry is designed to ensure the full opening pressure drop across the valve 68 is met. The hysteresis band of the control can be minimized by setting the spring force slightly below the closed pressure differential force. Once closed, the valve 68 remains in this position for the remainder of the emission until the engine is shut down and the pressure is relieved.

The subject invention provides a bleed valve 68 that is self-actuating and provides many advantages over traditional poppet style valves. The self-actuated, dual-pivot flapper valve provides a streamline configuration to minimize a packaging envelope and radial extension of the valve. In addition, the subject bleed valve 68 provides a structurally sound configuration with minimal parts that operates with minimal restriction. The outer mount, dual pivot allows the flapper doors to open to the outer edge of the valve thereby exposing more flow area and reducing flow loss. As such, the dual pivot provides a maximum open area for reduced flow restriction. Further, this configuration allows for customization of the pivot assemblies to maximize the flow area.

Additionally, the symmetric/non-cantilever configuration provides an optimum configuration for high vibration environments. The disclosed configuration contains the internal pressure and prevents external leakage from the unit. This duct mounted, in-line configuration comprises a light weight, compact and controllable bleed system that can reliably operate at elevated temperatures and pressure, and which has reduced manufacturing cost compared to prior poppet designs.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A bleed valve comprising:
a valve body comprising an inlet housing and an outlet housing mounted to the inlet housing;
a first flapper body movable relative to the valve body between an open position and a closed position;
a second flapper body movable relative to the valve body between an open position and a closed position, and wherein one of the inlet housing and the outlet housing includes a valve seat to define the closed position;
a resilient member biasing the first and second flapper bodies to the open position to vent bleed air, wherein the resilient member and the first and second flapper bodies are enclosed within the valve body, and wherein when a pressure load across the first and second flapper bodies exceeds a biasing force of the resilient member the first and second flapper bodies move to the closed position, and wherein the inlet and outlet housings cooperate to provide a radially enlarged portion that receives the resilient member; and
at least one seal between the inlet housing and the outlet housing.

2. The bleed valve according to claim 1 wherein the valve body defines a flow path, and wherein the first and second flapper bodies are configured to move to the closed position to prevent flow through the valve body by closing the flow path.

3. The bleed valve according to claim 1 wherein the first flapper body has one end coupled for movement with a first pivot shaft and extends to a first distal end that pivots about a first pivot axis, and wherein the second flapper body has one end coupled for movement with a second pivot shaft and extends to a second distal end that pivots about a second pivot axis, and wherein the valve body includes the valve seat that abuts against the first and second distal ends to define the closed position.

4. A bleed valve comprising:
a valve body mounted within a compressor section of a gas turbine engines;
a first flapper body movable relative to the valve body between an open position and a closed position;
a second flapper body movable relative to the valve body between an open position and a closed position; and
a resilient member biasing the first and second flapper bodies to the open position to vent bleed air, wherein the resilient member and the first and second flapper bodies are enclosed within the valve body, and wherein when a pressure load across the first and second flapper bodies exceeds a biasing force of the resilient member the first and second flapper bodies move to the closed position, and wherein the first and second flapper bodies are biased to the open position during an engine start-up condition and are moved to the closed position during a steady-state engine condition when the pressure load exceeds the biasing force.

5. A bleed valve comprising:
a valve body;
a first flapper body that pivots about a first pivot axis and is movable relative to the valve body between an open position and a closed position;

a second flapper body movable relative to the valve body between an open position and a closed position, and wherein the second flapper body pivots about a second pivot axis independently of the first flapper body;

a resilient member biasing the first and second flapper bodies to the open position to vent bleed air, wherein the resilient member comprises at least a first spring associated with the first flapper body and a second spring associated with the second flapper body, and wherein the resilient member and the first and second flapper bodies are enclosed within the valve body, and wherein when a pressure load across the first and second flapper bodies exceeds a biasing force of the resilient member the first and second flapper bodies move to the closed position;

a first pivot shaft mounted to the valve body to define the first pivot axis and a second pivot shaft mounted to the valve body to define the second pivot axis, and wherein the first spring is associated with the first pivot shaft and the second spring is associated with the second pivot shaft; and wherein the valve body includes a first portion defined by a first diameter and a second portion defined by a second diameter greater than the first diameter such that the second portion comprises a radially enlarged portion of the valve body that receives the first and second pivot shafts.

6. The bleed valve according to claim 5, wherein the valve body defines a center axis along which air flows through the valve body, and wherein the first and second pivot axes are non-parallel with the center axis, and wherein the first pivot axis is spaced radially outwardly of one side of the center axis and the second pivot axis is spaced radially outwardly of an opposite side of the center axis.

7. The bleed valve according to claim 5, wherein the first flapper body has one end coupled for movement with the first pivot shaft and extends to a first distal end that pivots about the first pivot axis, and wherein the second flapper body has one end coupled for movement with the second pivot shaft and extends to a second distal end that pivots about the second pivot axis, and wherein the valve body includes a seat that cooperates with the first and second distal ends to define the closed position.

8. A gas turbine engine comprising:
a compressor section;
an air plenum in communication with the compressor section; and
a bleed valve in communication with the air plenum and moveable between an open position and a closed position dependent upon pressure within the compressor section, wherein the bleed valve comprises
a valve body defining a flow path,
a first flapper body movable relative to the valve body between an open position and a closed position,
a second flapper body movable relative to the valve body between an open position and a closed position, and a resilient member biasing the first and second flapper bodies to the open position to vent bleed air out of the air plenum, and wherein when a pressure load across the first and second flapper bodies exceeds a biasing force of the resilient member the first and second flapper bodies move to the closed position to prevent flow through the valve body by closing the flow path.

9. The gas turbine engine according to claim 8, wherein the resilient member comprises at least a first spring associated with a first pivot shaft that defines a first pivot axis and a second spring associated with a second pivot shaft that defines a second pivot axis, and wherein the first spring and first pivot shaft are associated with the first flapper body and the second spring and second pivot shaft are associated with the second flapper body.

10. The gas turbine engine according to claim 9 wherein the valve body includes a first portion defined by a first diameter and a second portion defined by a second diameter greater than the first diameter such that the second portion comprises a radially enlarged portion of the valve body that receives the first and second pivot shafts.

11. The gas turbine engine according to claim 9, wherein the valve body defines a center axis along which air flows through the valve body, and wherein the first and second pivot axes are radially spaced from the center axis and from each other such that the first flapper body pivots about the first pivot axis and the second flapper body pivots about the second pivot axis independently of each other.

12. The gas turbine engine according to claim 8, wherein the first flapper body has one end coupled for movement with the first pivot shaft and extends to a first distal end that pivots about the first pivot axis, and wherein the second flapper body has one end coupled for movement with the second pivot shaft and extends to a second distal end that pivots about the second pivot axis, and wherein the valve body includes a seat that cooperates with the first and second distal ends to define the closed position.

13. The gas turbine engine according to claim 12 wherein the seat comprises a rib that abuts against the first and second distal ends when in the closed position.

14. The gas turbine engine according to claim 8, wherein the first and second flapper bodies are biased to the open position during an engine start-up condition and are moved to the closed position during a steady-state engine condition when the pressure load exceeds the biasing force.

15. The gas turbine engine according to claim 8 wherein the valve body comprises an inlet housing and an outlet housing mounted to the inlet housing, wherein one of the inlet and outlet housing includes a valve seat to define the closed position, and including at least one seal between the inlet housing and the outlet housing.

16. The gas turbine engine according to claim 8 wherein the valve body completely encloses the first flapper body, the second flapper body, and the resilient member.

* * * * *